Jan. 5, 1932.          A. DEWANDRE          1,839,954
SERVO BRAKE
Filed Sept. 14, 1925          3 Sheets-Sheet 1
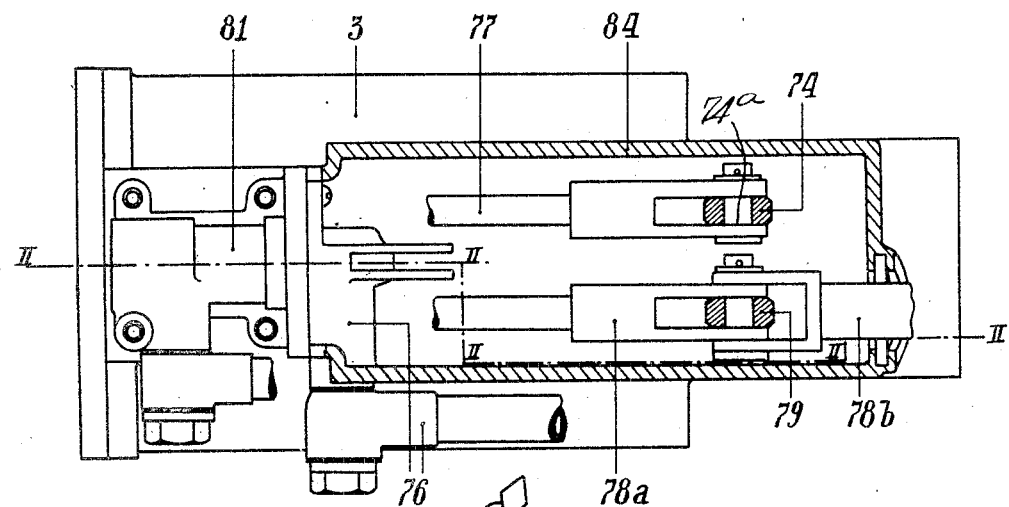
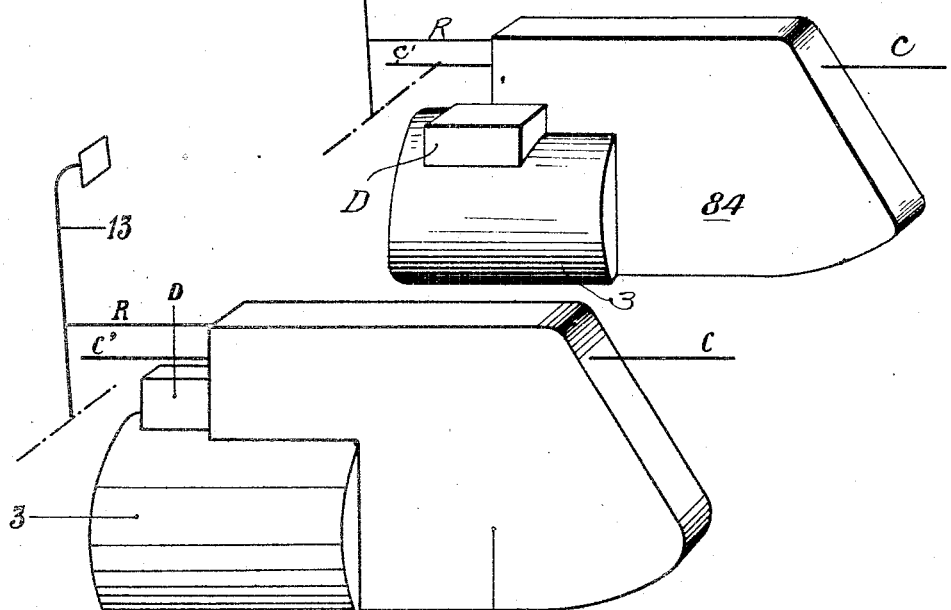
Inventor:
Albert Dewandre
By
Attorney

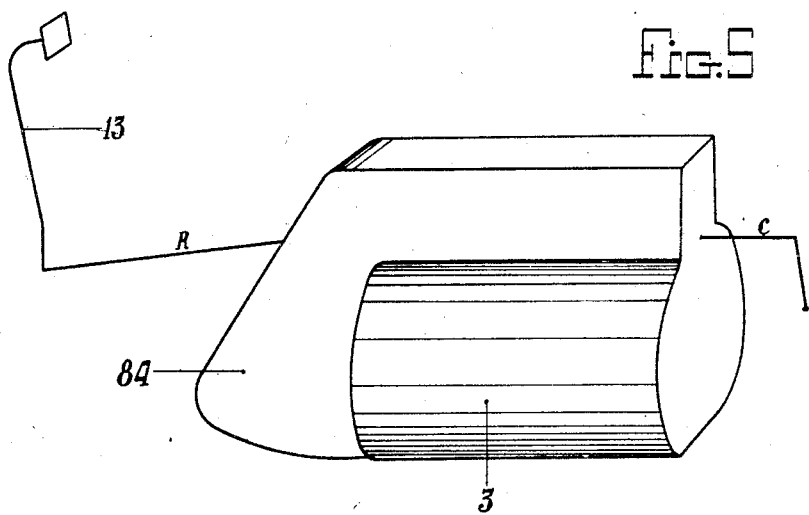
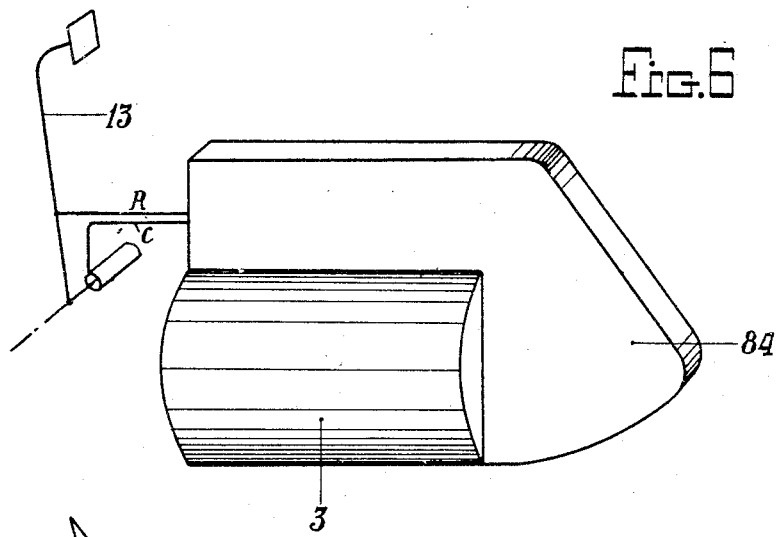
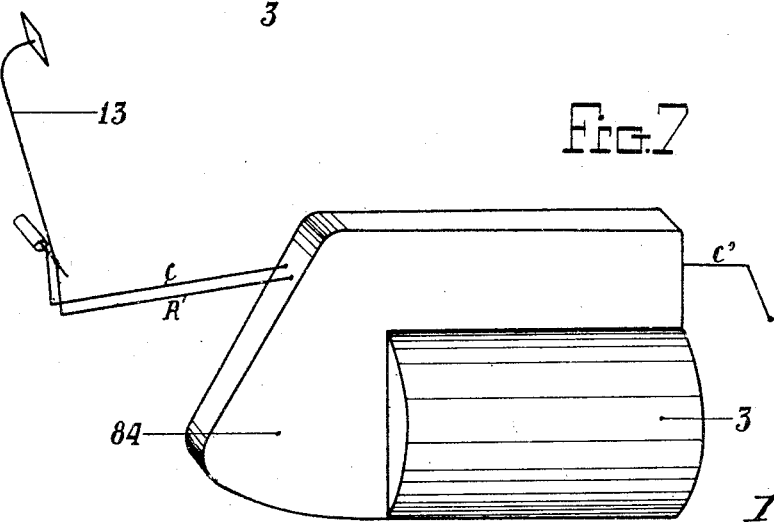

Patented Jan. 5, 1932

1,839,954

UNITED STATES PATENT OFFICE

ALBERT DEWANDRE, OF BRUSSELS, BELGIUM, ASSIGNOR TO SERVO-FREIN DEWANDRE SOCIETE ANONYME, OF LIEGE, BELGIUM

SERVO BRAKE

Application filed September 14, 1925, Serial No. 56,319, and in Belgium August 10, 1925.

This invention is directed to an improvement in servo-brakes of the type wherein the braking force is obtained by the action of a piston connected to the brake mechanism, with the piston operated through the power obtained either through the creation of a partial vacuum on one side of the piston, as by suction on the piston, the pressure differences on the piston thus created being governed through a distributor.

The invention is more particularly concerned with the control through a servo-brake of the type described of the brakes of an automotive vehicle and with an understanding of the comparatively limited space in such vehicles for the installation of a brake control assembly of this type, and the further knowledge that the initial adjustment of the various control elements of the servo-brake assembly must not be disturbed during such installation, the provision of means by which a convenient installation of the assembly may be carried out without the necessity of expert assistance becomes important.

The primary object of the invention, therefore, is the provision of a casing or equivalent element in which the various parts of the servo-brake assembly may be conveniently mounted and initially adjusted to thereby provide a unit arrangement which may be conveniently handled and secured on the vehicle as a unit and which, when in position, requires merely the connection of the appropriate parts of the servo-brake assembly to the correspondingly appropriate part of the automobile.

More specifically, the invention comprehends a casing including as a more or less integral construction a cylinder for the brake operating piston and a housing for the distributor for controlling the pressure differences, together with a lever system arranged for operative communication with the brake pedal or lever and with the brakes and connected as a part of the unit arrangement with the distributor and with the piston so that following the mounting of the casing in appropriate position on the vehicle and the subsequent connection of the lever system to the brakes and to the brake pedal or lever and the connection of the distributor to the source of power, the vehicle assemblage is complete without necessitating or requiring any change or connection of the parts within the casing.

The invention is illustrated in the accompanying drawings, in which:—

Figure 1 is a horizontal sectional view of one form of the invention, the line of section being that indicated at 1—1 in Figure 2.

Figure 4 is a diagrammatic view of the arrangement shown in Figures 1 to 3.

Figures 5, 6, 7 and 8 are diagrammatic views of modified arrangements including the invention.

In the form shown in Figures 1 to 4 inclusive, the casing, indicated at 84, is in the form of a hollow body, the side walls proper of which are in parallel relation, with the top and bottom walls substantially parallel, and the rear wall downwardly and outwardly inclined for a portion of its length. Formed integrally with the casing or independently formed and secured to the casing to provide a fixed part thereof is a cylinder 3. This cylinder has a diameter exceeding the width of the casing proper and is arranged in the lower forward portion of the casing, with the wall of the cylinder extending through and beyond the side walls of the casing and forming in effect a continuation of said side walls, with that portion of the cylinder wall which is in alignment with the bottom edge wall of the casing forming a part of such bottom edge wall.

The cylinder 3 has a diameter less than the height of the casing, and extends forwardly of the forward edge wall of the casing, the forward end of the cylinder being closed and the rear end of the cylinder opening within the casing, those portions of the rear end of the cylinder which extend beyond the side walls of the casing being closed.

Supported upon the forwardly projecting portion of the cylinder 3 is a distributor housing 81. This housing is integral with or forms a fixed part of the forward wall of the casing proper and the upper portion of the projecting cylinder wall, the housing being of relatively small diameter, closed at its forward end and opening at its rear end within the casing.

The casing proper, therefore, includes either as an integral structure or with the parts relatively fixed, a casing for certain operating parts to be described, a cylinder in which the piston for operating the brakes is mounted, and a housing for enclosing the distributor valves.

Mounted in the casing rearwardly of and above the open end of the cylinder 3 is a lever system which forms the subject-matter of a copending application filed September 14, 1925, Serial No. 56,320. For the purposes of the present invention, this lever system may be briefly described as follows:—

Figure 2:
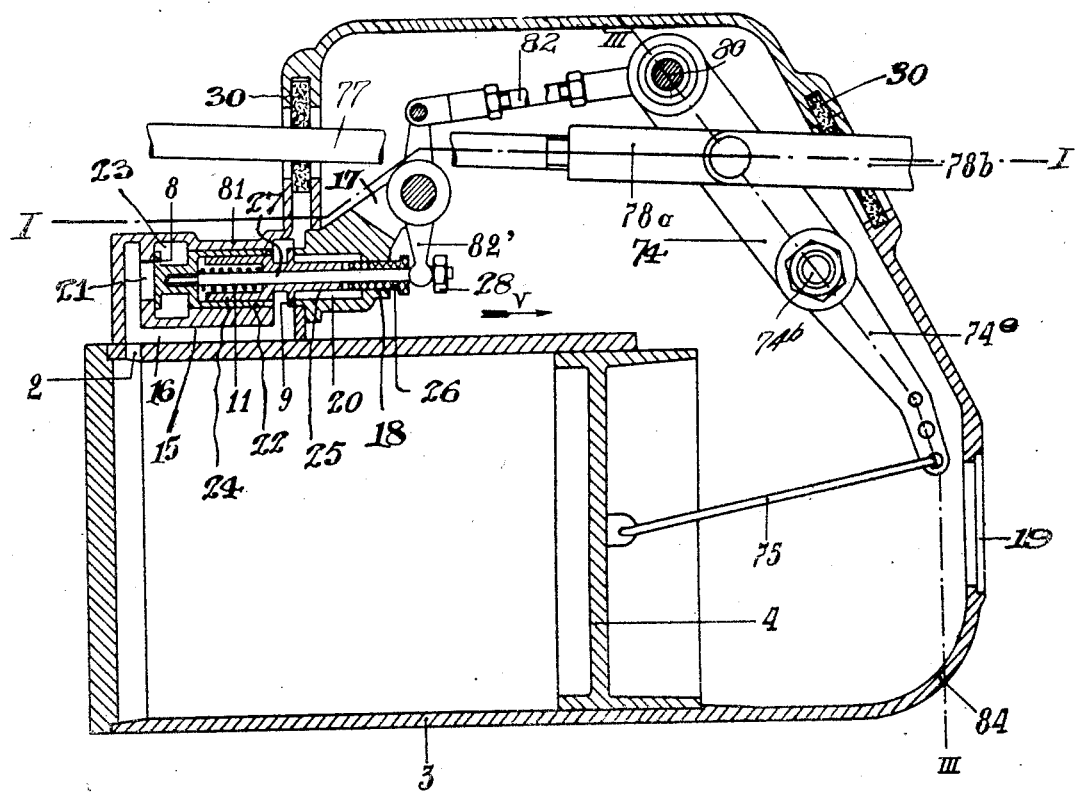
Figure 2 is a vertical section of the same taken on the line II—II in Figure 1.
Figure 3:
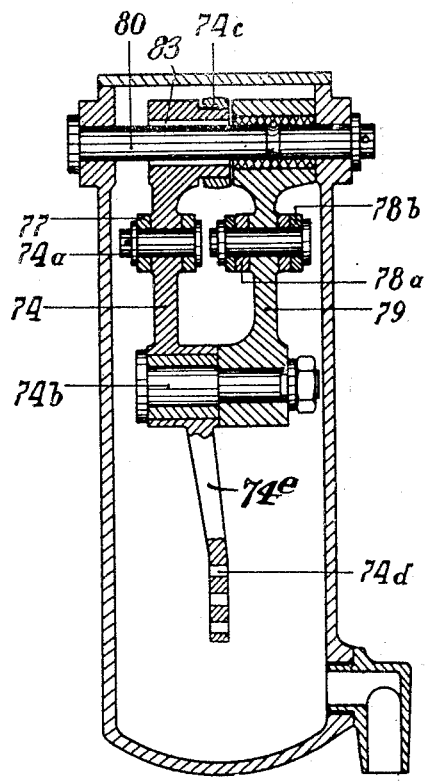
Figure 3 is a vertical section on the line III—III of Figure 2, the section being at right angles to that in Figure 1.

With particular reference to Figures 1, 2 and 3, the lever system comprises levers 74 and 79 mounted upon a shaft 80 fixed in the side walls of the casing near the upper rear portion of such casing. These levers depend from the shaft 80 and are pivotally and relatively connected at their lower ends by a shaft 74$^b$ which, aside from its connection with the levers, is wholly free within the casing. The lever 74 is extended below the shaft 74$^b$, as at 74$^a$, the lower end of this lever being connected by a link 75 with a piston 4 operative within the cylinder 3. The connection of the link 75 with the extension 74$^a$ of the lever 74 may be varied for adjustment purposes through the provision of a plurality of holes 74$^d$ in the extension 74$^a$, as clearly shown in Figure 2.

The opening in lever 74 through which the shaft 80 extends has a diameter somewhat greater than that of the shaft to thereby permit an independent movement of the lever 74 on the shaft 74$^b$ as a center to the extent permitted by the excess diameter of the opening in such lever about the shaft 80. The valve mechanism arranged within the distributor 81 forms the subject-matter of Patent No. 1,675,023, granted to me June 26, 1928, and for the purposes of this application may be briefly described as follows:—

A wall 15 is arranged within the distributor housing 81, said wall defining a channel 16 open to one end of the cylinder 3 through a port 2. A bracket 17 is fixed to the forward wall of the casing in line with the distributor, this bracket being formed with an opening 18 in line with the valve space, which opening is circumferentially enlarged at 20 and in communication with the interior of the casing to provide an atmospheric vent, the casing having an opening 19 at a convenient point to establish communication between the interior of the casing and the atmosphere. A valve 8, which may be termed the suction or power valve, controls an opening 21 through the wall 15 and leading to the channel 16. The valve 8 has a cylindrical extension 22 slidable in the valve space, the space 23 with which the opening 21 communicates providing the power end of the distributor and being connected in any suitable manner (not shown) with a source of suction. The end of the bracket 17 next to the distributor provides a valve seat with which a valve 9 is arranged to cooperate. This valve 9 has a cylindrical extension 24 slidable within the extension 22 of the valve 8, a spring being arranged within the first mentioned extension and serving to hold the respective valves normally seated. The exhaust valve 9 which controls the atmospheric vent has an extension 25 which passes through the opening 18 in the bracket and terminates in a head 26. The wall 15 is interrupted or slotted to establish communication between the exhaust passage 20 and the channel 16. A rod 27 passes slidably through the extension 25 of the exhaust valve and is terminally connected to the inlet valve 8, this rod beyond the head 26 having an adjustable nut terminal at 28 normally spaced from the head 26. A lever 82' is pivotally supported upon the bracket 17, this lever having a forked lower end to embrace the rod 27 between head 26 of the exhaust valve and nut 28 on the rod 27. The upper end of the lever 82' is connected through the medium of a rod 82 with a ring 74$^c$ which encircles a reduced portion of that terminal of lever 74 which loosely embraces the shaft 80. The lever 74 at a point immediately between the shafts 80 and 74$^b$ is connected to the usual brake pedal 13 by rods 77, while the brakes are connected to the lever 79 by rods 78$^a$ and 78$^b$, assuming front and rear wheel brakes, the former leading to the front wheel brakes and the latter to the rear wheel brakes. Of course, if only the rear wheel brakes are employed, only the rod 78$^b$ is necessary.

The rods 77 and 78$^a$ leading through the forward wall of the casing and the rod 78$^b$ leading through the rear wall of the casing preferably pass through a sealing member in the form of a leather disk or strip 30 which closely encircles the particular rod and is arranged in a double wall formation surrounding the opening. Of course, the respective rods, in addition to their longitudinal movement, have an appreciable vertical movement incident to the varying centers as the rods move and, therefore, the openings in the casing must be of a size to accommodate the full movement of the particular rod, and in providing the sealing disks it is apparent that the rod may be permitted the necessary movement without unsealing the opening against the admission of dust and dirt incident to the travel of the vehicle.

In the application of the brakes, pressure is exerted on the brake pedal 13, exerting a pull on the rod 77. As this rod is connected to the lever 74 and the latter is permitted a limited free movement about the shaft 80 as described, the initial operation causes this lever 74 in this free movement to move the lever 82' through the rod 82, thereby moving the valve rod 27 to the right in Figure 2 in the direction of the arrow V and unseating the inlet valve 8, the spring 11 being further tensioned to maintain the exhaust valve closed. The operating suction is admitted to the cylinder 3 and moves the piston 4 toward the left in Figure 2. This movement of the piston 4 tends to operate the lever 74 and, through the shaft 74$^b$, the lever 79, with the effect to operate the rods 78$^a$ and 78$^b$, or the latter alone if rear brakes only are used, to apply the brakes.

In the initial movement of the lever 74 in the operation of the piston, there is a slight oscillation of the lever 74 about the connection of the pedal rod 77 thereto, for the pedal is held by the operator and the connection of the rod 77 to the lever 74 is for the moment a fixed point. Thus the pedal, and thereby the foot of the operator, is subjected to a reaction effect or force which is a fraction or in proportion to the magnitude of the braking force. This initial oscillation of the lever 74 permits a limited play of that end of the lever encircling the shaft 80, relieving the pull on the rod 82, permitting the lever 82' to return to normal position, and permitting the spring 11 to close the inlet valve 8. The power is thus cut off from the piston and the movement of the latter stops. Of course, under further or continued pressure upon the pedal 13, the action described is repeated or continued, with the effect to cause the piston 4 to travel to the extent desired to apply the brakes with any required force within the limit of the apparatus. The brakes being applied, a mere release of the foot pressure on the pedal 13 will tend to a release of the brakes.

In applied position, the upper end of the lever 74 is centralized with respect to the shaft 80, the inlet and exhaust valves 8 and 9 are closed, and the lever 82' is in neutral or normal position. The connection of the links 75 to the lever 74 now becomes the fixed point of leverage, and on release of the pressure on the pedal the initial movement is to cause the lever 74 to move to take up the play about the shaft 80, the movement, however, being of course in a direction reverse to that when pressure was exerted upon the pedal 13. This reverse movement of the lever 74 swings the lever 82' in the opposite direction, exerts pressure upon the head 26, and opens the exhaust valve to equalize the pressure on the respective sides of the piston, whereupon the parts return to normal position and the brakes are released.

While the present invention is primarily concerned with the unit structure described wherein the casing, cylinder and distributor are a unit and the various operating parts are housed within the casing, it is, of course, to be understood that the specific form of casing previously described is not necessarily the only form by which the various details of the invention may be carried out. The diagrammatic form of the casing just described is illustrated in Figure 4, the foot pedal rod being indicated at R, the forward brake pedal rod being indicated at C', and the rear brake pedal rod being indicated at C. The form shown in Figure 5 of the casing arranges the cylinder 3 wholly between the walls of the casing and the distributor (not shown) is housed completely within the casing.

It will be observed from Figure 4 that the rod C is not arranged in the same vertical plane as the rod R, if it be assumed that a vertical plane is one which is parallel to the lateral face of the casing 84. This rod C is situated to the left of the rod R, assuming that the observer is looking at the pedal 13.

Naturally the said rod may be situated to the right of the rod R as in the case of Figure 7. Similarly the distributor D instead of being in a central plane of the apparatus may be situated to one side of the center, as in Figure 8.

It is also to be observed that the casing 84 forms a box, the two larger faces of which (which faces are assumed to be vertical) have a trapezoidal shape.

In the case shown in Figure 4, the rod R enters into the said box through the vertical end face thereof. Naturally this rod may also enter the casing through the oblique end face; this would lead to an arrangement such as the one shown in Figure 5.

Figure 6 relates to an arrangement in which the shaft about which the pedal 13 is pivoted is a shaft forming part of the brake mechanism.

The rod C (Figure 6) which also forms part of the brake mechanism is accordingly bent toward and connected to this shaft. As a consequence the rods R and C traverse one and the same face of the box which, in this instance, is the vertical end face.

Naturally the arrangement may be such that these two rods traverse the oblique end face, as illustrated in Figure 7, where a rod C' passes through the opposite face of the casing 84. In this last arrangement the rod C' controls the back brakes.

The distributor is not shown in Figures 5, 6 and 7 but it may be placed either in a central position, as shown in Figure 4, or to one side of the center, as in Figure 8.

What I claim is:

1. A casing for servo-brake mechanisms including an integral construction having side walls and end walls, a cylinder in the casing, the wall of the cylinder projecting in part beyond the side walls of the casing, with one end of the cylinder projecting beyond one of the end walls of the casing, the cylinder terminating in an open end within the casing and spaced from one end wall thereof, and a distributor housing carried by and formed in part by the wall of the cylinder beyond the end wall of the casing, said distributor housing extending through one end wall of the casing and opening within the casing.

2. A casing for servo-brake mechanisms including an integral construction having side walls and end walls, a cylinder in the casing, the wall of the cylinder projecting in part beyond the side walls of the casing, with one end of the cylinder projecting beyond one of the end walls of the casing, the cylinder terminating in an open end within the casing and spaced from one end wall thereof, and a distributor housing carried by and formed in part by the wall of the cylinder beyond the end wall of the casing, said distributor housing extending through one end wall of the casing and opening within the casing, the side walls of the casing beyond the cylinder being substantially parallel and spaced apart a distance less than the diameter of the cylinder, said end walls above the plane of the distributor housing being formed with openings to permit the passage of operating connections beyond the casing.

In testimony whereof I affix my signature.

ALBERT DEWANDRE.